(12) United States Patent
Trentadue

(10) Patent No.: US 10,780,806 B2
(45) Date of Patent: Sep. 22, 2020

(54) METHOD FOR ASSEMBLING AN UPHOLSTERY FOR A SEAT OR FOR STUFFED FURNITURE AND RELATED UPHOLSTERY

(71) Applicant: SISTEMIAZIENDA S.R.L., Modugno (Bari) (IT)

(72) Inventor: Giovanni Battista Trentadue, Modugno (IT)

(73) Assignee: SISTEMIAZIENDA S.R.L., Modugno (Bari) (IT)

(*) Notice: Subject to any disclaimer, the term of this patent is extended or adjusted under 35 U.S.C. 154(b) by 129 days.

(21) Appl. No.: 16/072,603

(22) PCT Filed: Dec. 21, 2016

(86) PCT No.: PCT/IB2016/057870
§ 371 (c)(1),
(2) Date: Jul. 25, 2018

(87) PCT Pub. No.: WO2017/137821
PCT Pub. Date: Aug. 17, 2017

(65) Prior Publication Data
US 2019/0039488 A1 Feb. 7, 2019

(30) Foreign Application Priority Data

Feb. 12, 2016 (IT) .............. 102016000014778

(51) Int. Cl.
*B60N 2/58* (2006.01)
*B60N 2/70* (2006.01)
*D05B 93/00* (2006.01)

(52) U.S. Cl.
CPC ............. *B60N 2/5883* (2013.01); *B60N 2/70* (2013.01); *D05B 93/00* (2013.01);
(Continued)

(58) Field of Classification Search
CPC ...... B60N 2/58; B60N 2/5883; B60N 2/5816; B60N 2/70; B60N 2205/30; D05B 93/00;
(Continued)

(56) References Cited

U.S. PATENT DOCUMENTS 1,219,023 A 3/1917 Merritt
1,293,576 A 2/1919 Tate
(Continued)

FOREIGN PATENT DOCUMENTS

JP H10295967 A 11/1998

OTHER PUBLICATIONS

International Search Report and Written Opinion dated May 8, 2017 for counterpart PCT Application No. PCT/IB2016/057870.
(Continued)

*Primary Examiner* — Ismael Izaguirre
(74) *Attorney, Agent, or Firm* — Shuttleworth & Ingersoll, PLC; Timothy J. Klima

(57) ABSTRACT

A method for assembling an upholstery for a seat or for stuffed furniture including the steps of: providing a first upholstery element and a second upholstery element to be sewn together, wherein the first upholstery element and the second element have a visible upper surface and a non-visible lower surface; placing a first edge of the first element alongside a first edge of the second element until they are in abutting contact, that is head against head, in a coplanar way; sewing the first edge of the first element to the first edge of the second element with a stitch chosen from classes 300, 400 or 600.

10 Claims, 2 Drawing Sheets

(52) U.S. Cl.
CPC ...... *B60N 2205/30* (2013.01); *D10B 2505/08* (2013.01); *D10B 2505/12* (2013.01)

(58) Field of Classification Search
CPC ...... D05B 15/00; D05B 3/00; D10B 2525/08; D10B 2525/12
See application file for complete search history.

(56) References Cited

U.S. PATENT DOCUMENTS

| | | | | |
|---|---|---|---|---|
| 2,539,364 | A * | 1/1951 | Dimond | A43B 9/04 36/25 R |
| 2,738,527 | A * | 3/1956 | Weiss | A43B 3/14 12/142 R |
| 4,095,542 | A * | 6/1978 | Hirschman | A61F 13/15577 112/475.06 |
| 4,303,712 | A | 12/1981 | Woodroof | |
| 4,573,420 | A | 3/1986 | Carson | |
| 4,999,845 | A * | 3/1991 | Jenks, Jr. | A41D 13/012 2/2.16 |
| 5,643,513 | A * | 7/1997 | Searle | B29C 44/1204 264/222 |
| 6,216,619 | B1 * | 4/2001 | Musco | D05B 21/00 112/475.05 |
| 2004/0095648 | A1 * | 5/2004 | McCannel | B29C 45/14688 359/619 |
| 2010/0077634 | A1 * | 4/2010 | Bell | A41D 27/24 36/54 |
| 2010/0122755 | A1 * | 5/2010 | Post | G10G 7/00 150/162 |
| 2014/0182498 | A1 | 7/2014 | Torigoe | |

OTHER PUBLICATIONS

Chinese Office Action dated May 25, 2020 from counterpart Chinese App No. CN201680084574.

* cited by examiner

Fig.1
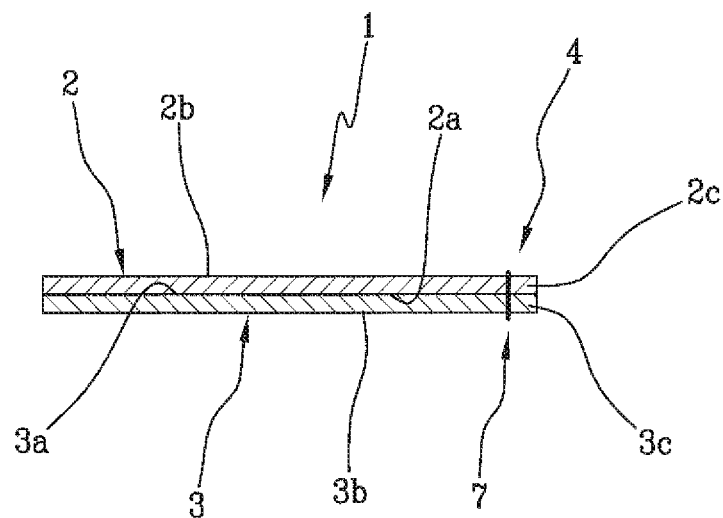
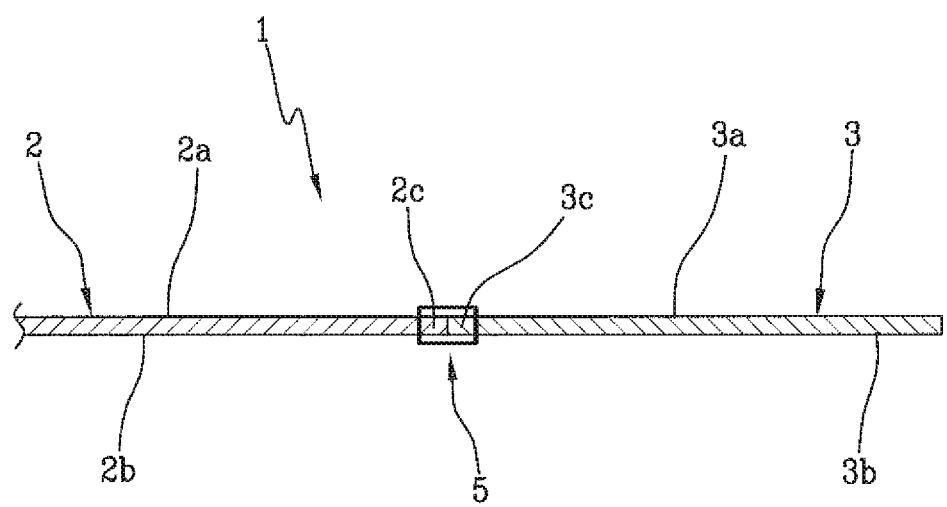
Fig.2

Fig.3
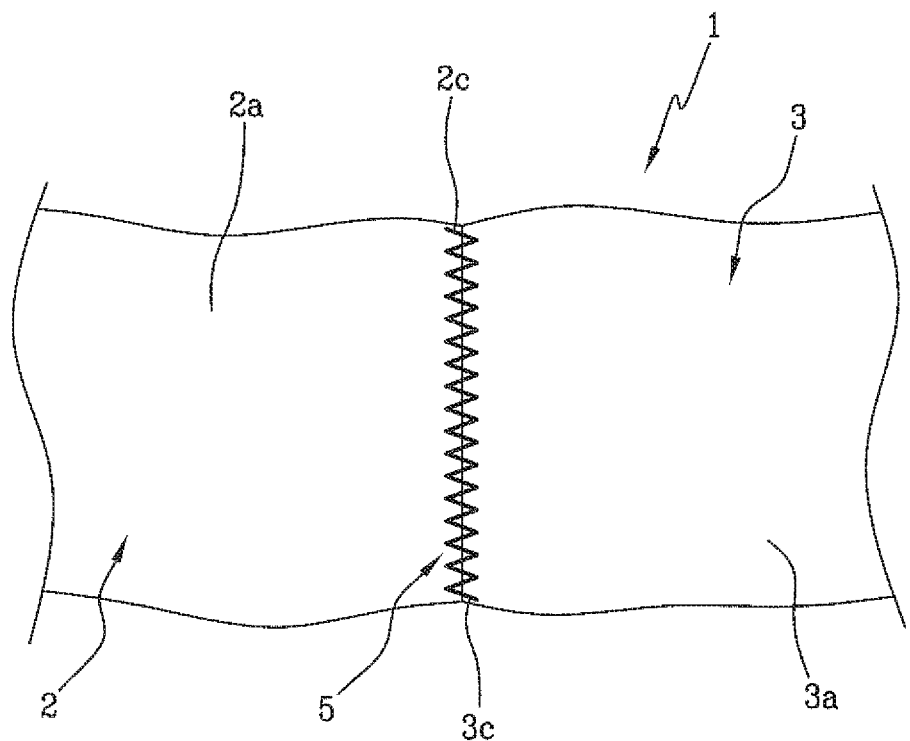
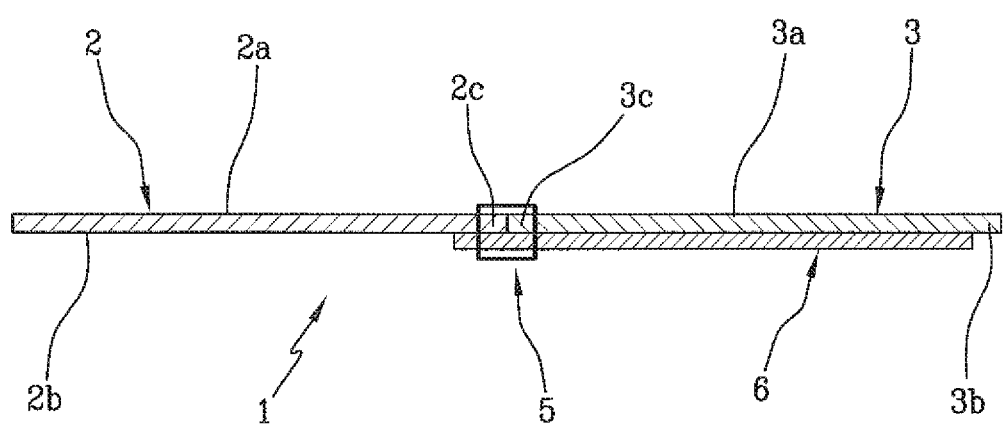
Fig.4

METHOD FOR ASSEMBLING AN UPHOLSTERY FOR A SEAT OR FOR STUFFED FURNITURE AND RELATED UPHOLSTERY

This application is the National Phase of International Application PCT/IB2016/057870 filed Dec. 21, 2016 which designated the U.S.

This application claims priority to Italian Patent Application No. 102016000014778 filed Feb. 12, 2016, which application is incorporated by reference herein.

TECHNICAL FIELD

The present invention relates to a method for assembling an upholstery for a seat or for stuffed furniture.

The subject matter of the present invention is also an upholstery obtained through said method.

The present invention finds particular application in the production of seats (of cars, trains, ships, planes, theatres, cinemas, etc.) and stuffed furniture (sofas, armchairs, cushions, beds, etc.) with natural leather and/or similar upholstery (eco leather, reground leather, crust leather, microfibre, technical fabric, alcantara, compact fabric, etc.).

In the present document, the definition "assembling the upholstery" refers to the technique of joining the pieces that form the upholstery itself, i.e. the activities whose aim is the composition of a single item by joining various pieces.

By way of non-limiting example, reference will hereby be made to natural leather upholstery (hereinafter simply called "leather") for a seat, without thereby wishing to limit the invention exclusively to seats made of leather alone.

The upholstery is currently produced by sewing leather edges overlapping with one another. Such overlapping, along the borders of the various leather elements to be joined, inevitably generates a concentration of multiple layers of leather on the (not visible) inside of the upholstery itself.

In the assembly step of the upholstery for a seat, these layers, which run along the seams of the upholstery, form "seam cords" or "joining cords".

Seam cords have always been considered a natural consequence of the production process. In actual fact they are, effectively, processing waste, which has an impact on the efficiency and effectiveness of the production process, the comfort and durability of the seat.

The stitch used for assembling leather upholstery is the "straight" also known as the "plain" one (corresponding to stitch 301, according to the DIN 61400 classification of 1991). This type of stitch only works if the leather edges are overlapping with one another.

Currently, the process used for assembling the leather upholsteries of a seat always envisages the overlapping of two pieces of leather to be joined, by placing their respective top surfaces in contact, also known as the "grain side" of the leather. Therefore, respective end portions of each leather edge are fitted together by overlapping.

By following the indications on the sewing technical sheets, the edges to be joined are appropriately aligned and prepared for sewing. Then the edges are joined by a seam with a straight stitch performed on the bottom part of the leather, also known as the "flesh side".

The seam thus obtained joins the two pieces of leather along a line that advances maintaining a distance of about 10-12 mm from their borders. Such distance may vary according to different factors (technical requirements, operators' skills, etc.). The portions of leather that go from the seam line to the border of each leather edge are processing waste, actually known as seam cords. The seams made by the overlapping between various pieces of leather, as the assembly operations are performed, form an item that is increasingly less manageable, since it is composed of a constantly increasing number of pieces of leather and the related joining cords.

Furthermore, the item formed is much more rigid. In fact, when trying to fold it in the opposite direction to the seam much more strength is required to contrast the resistance to folding of the upholstery, added to the resistance of the cords, which are perpendicular to the folding direction.

By repeating the steps set out above a single item is obtained: the leather upholstery for seats. In a second processing step, this will be applied to the load-bearing structure of the seat, leaving only the grain side of the leather visible. The seam cords will not actually be visible but will be easily recognisable to the touch, due to the "excess" leather which characterises them.

This obviously makes the seat not very pleasant to the touch, and in some cases even uncomfortable, and above all leads to a considerable amount of waste material which implies higher production costs.

The object of the present invention is to provide a method for assembling an upholstery for a seat or for stuffed furniture and the related upholstery that overcome the above-described drawbacks of the prior art.

It is therefore an object of the present invention to provide a method for assembling an upholstery for a seat or for stuffed furniture, which allows the amount of material used for producing the upholstery to be significantly reduced therefore reducing the costs and environmental impacts of the process for producing the seat or the stuffed furniture.

It is also an object of the present invention to provide a method for assembling an upholstery for a seat or for stuffed furniture that simplifies the production process also making the whole upholstery more manageable throughout all its production steps.

It is also an object of the present invention to provide a method for assembling an upholstery for a seat or for stuffed furniture that reduces the number and type of machines to be used in the production process.

Finally, an object of the present invention is to provide a method for assembling an upholstery for a seat or for stuffed furniture that allows a more comfortable seat or stuffed furniture and with a greater visual impact to be obtained.

These and other objects are substantially achieved by a method for assembling an upholstery for a seat or for stuffed furniture according to what is described in one or more of the attached claims.

Further characteristics and advantages of the present invention will become clearer from the detailed description of a preferred and not exclusive embodiment of a method for assembling an upholstery for a seat or for stuffed furniture and the related upholstery in accordance with the present invention.

This description is provided with reference to the accompanying figures, which are also provided purely by way of illustrative and thus non-limiting example, in which:

FIG. 1 is a schematic view of a traditional method for assembling the elements of a seat or of stuffed furniture, according to what is known in the sector;

FIG. 2 is a schematic view of a first step of a method for assembling a seat or of stuffed furniture, in accordance with the present invention;

FIG. 3 is the plan view of the diagram illustrated in FIG. 2;

FIG. 4 is a schematic view of a further step of the method according to the present invention.

With reference to the figures described above, 1 generally indicates an upholstery for seats or stuffed furniture.

The upholstery 1 is formed by joining a plurality of elements or pieces of material, appropriately shaped to be sewn together and finally wrapped around the seat or the stuffed furniture to be upholstered.

The present description makes general reference, for simplicity purposes, only to a first upholstery element 2 and to a second upholstery 1 element 3, it being implied that the upholstery 1 is composed of a plurality of elements of material assembled together with the method according to the present invention.

All the pieces of material constituting the upholstery 1, therefore specifically the first element 2 and the second element 3, have an upper visible surface 2a, 3a, also known as the "grain side", and a lower non-visible surface 2b, 3b, also known as the "flesh side".

FIG. 1 illustrates a traditional method for assembling two edges of material to be sewn that envisages the overlapping of a first upholstery 1 element 2 and a second upholstery 1 element 3 to be sewn together.

In the method known and used in the prior art, the first 2 and the second 3 element are overlapped with one another by placing the respective borders 2c and 3c in contact, in particular by placing in contact the corresponding grain sides 2a, 3a. The seam 7, which is located 10-12 mm from the border, used for keeping the two edges together, is obtained through a straight stitch (corresponding to stitch number 301, according to the classification of standard DIN 61400 of 1991). The overlapping of material creates a seam cord 4 of the upholstery 1, comprising the edge 2c of the element 2 and the edge 3c of the element 3.

FIG. 2, instead, presents a method for assembling a seat or stuffed furniture, in accordance with the present invention.

A first upholstery 1 element 2 is placed alongside, and not overlapping, a second upholstery 1 element 3 to be sewn together.

In particular, a first edge or border 2c of the first element 2 and a first edge or border 3c of the second upholstery 1 element 3 are placed alongside one another and placed in abutting contact without overlapping, that is in head-head contact, so as to be coplanar. The first edge 2c of the first element 2 and the first edge 3c of the second element 3 are placed alongside each other and sewn together, with a stitch chosen from classes 300, 400 and 600.

In this case the edges or borders 2c and 3c, respectively of the element 2 and the element 3, no longer form a non-visible joining cord (waste), but an integral and visible part of the upholstery (1).

For completeness, it is pointed out that the existing types of stitches have been grouped into six classes (classes 100, 200, 300, 400, 500, 600) by standard DIN 61400 of 1991. The types of stitch that are most suited to fulfilling the proposed solution are included in classes 300, 400 and 600. Within each class the stitch types of each family are indicated. Each family groups together a certain function of the stitch type. In particular, within these three classes, the stitches that are preferably used are: in class 300 stitches 304, 305, 310 and 312, in class 400 stitches 404 and 405, and in class 600 stitches 601, 602, 603, 604, 605 and 606.

Class 300 groups together the stitches formed by knotting. The most well known and used stitch is definitely stitch 301 which is called a plain stitch or lockstitch and is currently used for straight or smooth seams and requires the overlapping of the pieces to be joined.

Stitch 301 is generally used for performing seams on leather and heavy fabrics with waxed threads.

Among all the other stitches, a stitch that has been discovered to be more suitable than the others for the purpose, without thereby excluding the stitches listed above, is stitch 304, known as the zig-zag.

This preference is mainly dictated by the fact that it is a simple and aesthetically pleasant stitch, very resistant and difficult to undo and is a universal type of seam.

A universal seam means the type of seam that can be used for all types of join as long as the materials to be joined have the right resistance.

This type of stitch is performed by linking together two threads: the slipknot of the thread inserted by the needle into the fabric is tied by a second thread (crochet thread). Furthermore, in the formation of the zig-zag stitch the linking between the two threads (needle thread and crochet thread) takes place exactly at the centre of the pieces of leather to be sewn and is therefore not visible. Continuing, in the zig-zag stitch, the upper and lower side of the seam have the same appearance, it is a stitch that can be performed backwards and is therefore well suited to automatically performing the overlocking stitches at the beginning and end of the seams and finally the tools for its creation are known all over the world.

The resulting seam is not very elastic and difficult to undo.

Therefore, in the following description, reference will be made, purely by way of non-limiting example, to the zig-zag stitch 5.

The zig-zag stitch 5 of FIG. 2, in place of the straight one 7 of FIG. 1, guarantees a perfect hold and resistance to tearing of the material, also following repeated tensile stress, both static and dynamic.

Advantageously, to obtain a resistant seam without the material tearing, the width of the seam's stitch must be adjusted to a value comprised between 2 and 10 mm, preferably between 4 and 6 mm and even more preferably 5 mm, while the length must be adjusted to a value comprised between 0.2 mm and 4 mm, preferably between 1 and 2 mm, even more preferably 1.5 mm.

Therefore, after the two edges to be joined have been placed in abutment, they are sewn keeping the upholstery with the visible side upwards and splitting the width of the seam halfway between the parts to be joined.

Traditionally a seam with a zig-zag stitch 5 has always been used as an ornamental seam and, therefore, has always been considered a stitch with low tensile strength and which implies significantly higher sewing time than seams with straight stitches 7.

Laboratory tests have actually shown that the tensile strength, for elements joined with zig-zag seams 5 is higher than 400 Newton, i.e. higher than the minimum tensile strength threshold required of leather to be used for this purpose. This value is, in fact, considered, by most companies in the sector, the limit parameter beyond which the leather is acceptable in terms of tensile strength.

The tests were performed with zig-zag stitches 5 having a width of 5 mm or 6 mm and with thread having an external/internal count of 40/40 or 40/60. In all cases, as the intensity of the tensile strength applied increases, the thread and the seam were found to be intact. Beyond a certain threshold, well above that of 400 N, accepted as the limit value by the main companies in the sector, the natural tearing of the leather arose, while the seam 5 remained intact.

The seam without overlaps, known as an "abutted" or "flat" seam, therefore allow the upholstery to have an appearance without joining cords.

The method proceeds by repeating the coplanar arrangement of all the edges of the upholstery 1 appropriately placing them in abutment and joining them with a zig-zig seam, until the complete upholstery is formed.

The final upholstery and all the pieces or elements composing the upholstery 1 are formed by a material chosen from the group comprising natural leather, eco leather, reground leather, crust leather, microfibre, technical fabric, alcantara, compact fabric, etc.

The upholstery 1 may envisage, in some cases, further non-visible components, such as, for example, tensioning elements 6. The latter are potentially a part of the upholstery 1, so that, in a second processing step (assembly or application of the final upholstery on the structure of the seat or stuffed furniture), it is possible to put determined points of the upholstery itself in tension.

The tensioning element 6 may comprise a tensioning strip or ribbon, both made of fabric, non-woven fabric, felt or the like. The ribbon is used for putting the upholstery in tension in one point, while the strip puts the upholstery in tension along a line.

Specifically, it is appropriate to provide a tensioning element 6 to be placed below the first element 2 and the second element 3, as illustrated in FIG. 4. The tensioning element 6 is associated with the "flesh side", therefore in contact with the edges 2c, 3c of the bottom, non-visible surfaces 2b, 3b of the upholstery 1. It is then fastened to the first element 2 and to the second element 3 of the upholstery 1, exploiting the same zig-zag seam 5 that holds together the two leather edges of the upholstery 1.

Below, the main assembly steps of the leather upholstery without joining cords are illustrated solely by way of example. Following the sewing technical sheet, the borders of the pieces of leather to be joined, having respective top sides facing the same way (e.g. both "grain" sides upwards), they are moved towards one another in "abutment", i.e. their lateral surfaces are placed in contact while keeping the upholstery elements to be joined coplanar.

Once the two edges have been placed in contact, they are sewn. The stitch used is the "zig-zag" one (see FIG. 4).

The result of this type of join will be a single piece of leather that does not have joining cords along the seam line (see FIG. 3).

By repeating the steps indicated above, the upholstery for seats or stuffed furniture will be performed without joining cords.

The choice of the thread count, material and thread colour, as well as the type of stitch, width and length of the seam are dictated by aesthetic and functional factors, which may vary according to the cases.

It has therefore been seen that stitch 304 can be used as a joining stitch if used on materials of a certain thickness (from thicknesses of at least 0.3 mm to thicknesses of 2.5 mm, knowing that 90% of items are made with upholsteries with thicknesses between 0.8 and 1.5 mm) because the edges to be joined in abutment allow the tension of the thread to be sustained remaining flat and being alongside one another so as to almost make the junction line between the edges disappear. If the materials were very thin, the tensions could cause creasing on the items and cause significant blemishes on the upholstery itself.

Furthermore, it has been noted that stitch 304 is to be used for joining seams on compact materials such as natural leather and/or similar materials (eco leather, reground leather, crust leather, microfibre, technical fabric, alcantara, compact fabrics, etc.). Using this method on fabrics with a warp and weft, that have not undergone any compacting treatment, would lead to the risk of the fabric fraying (in fact, these types of fabrics must be hemmed on the cut borders to prevent fraying).

What has been described up to here expressly refers to leather-leather coupling. However, the above may easily be applied to lining-lining coupling because also in this case the coupling takes place forming a joining cord and using stitch 301.

Leather-lining coupling is used in so-called closing zones of the stuffed furniture (inside of arms, bottom of back, bottom part of seat cushions etc.). This type of coupling also takes place by creating a joining cord.

For this type of use it is best to shorten the pattern relating to leather by $10/12$ mm (cord) and leave the dimension of the pattern of the lining intact (as it is comprised of low environmental impact material). In relation to the coupling step, it is sufficient to place the lining $10/12$ mm overlapping with the leather, flesh side, and to sew flat about $5/6$ mm from the border so as to create a flat zig-zag seam with stitch 304 that is very strong and aesthetically pleasant (even if it is not normally visible). This solution guarantees the resistance of the seam to tension, saving on leather and the absence of a joining cord.

The method for assembling a seat or stuffed furniture according to the present invention reaches the objects proposed and results in significant advantages.

With respect to the current method for assembling upholstery for seats or stuffed furniture, the method described here allows the consumption of raw material, needed for producing the upholstery, to be reduced by a total of about 10-15% (net pattern) of current consumptions. If it is considered that for leather upholstery the cost of the raw material alone affects about 60% of the total cost of the seat or stuffed furniture, it is clear that such a method allows the same product to be obtained at a significantly lower cost.

The variability of the saving is connected with the model/version of the seat or stuffed furniture to be made.

The material saving, particularly if it is leather, also translates into the creation of more ecological and sustainable items; the quantity of raw material needed for producing the upholstery is reduced, which normally has a significant environmental impact (e.g. chemical products for processing leather, farming animals, etc.).

The product thus created is also more comfortable. In fact, the absence of joining cords, and therefore of concentrations of layers of leather under the upholstery, makes the surface of the upholstery itself perfectly smooth and soft along its seam lines. The removal of the internal cords also leads to added value from an aesthetic point of view, since the zig-zag seam is considered in itself an ornamental junction from the point of view of the design of the finished product. The planarity of the junction and the adhesion of the edges is fully guaranteed by the characteristics of the sewing machine (pressure foot) and the work of the operator and will make the finished product completely compliant with the designer's aesthetic design.

The absence of joining cords, therefore the absence of overlapping of the upholstery edges, also leads to the halving of the thicknesses during processing and therefore another series of advantages such as, for example, the elimination of the skiving step, which translates into a saving of about 8-10 minutes per seat for leather with thicknesses over 1.3 mm. In addition to this, a further saving comes from the possibility of not necessarily having to purchase the skiving machine and the beating machine, and being able to perform the complete process on a single work station, without moving materials and/or operators.

Another advantage due to the absence of joining cords is the reduction of broken threads and needles, which is greater than or equal to 50%. In fact, these breakages happen due to the overheating of the needle and thread due to the friction created during their passage through the high thicknesses of the leather, the latter deriving from the repeated overlaps of the various edges to be joined. This leads to the possibility of using thinner needles and threads, which allow the aesthetic impact of the holes on the leather to be reduced and to have a longer length of thread loaded onto the spool of the sewing machine, hence reducing the thread/spool change episodes which represent a criticality and a loss of time for the process.

Furthermore, the absence of joining cords allows greater manageability of the upholstery during assembly, due to the reduction of the mass of material to be moved.

Another advantage arises in the assembly step of the upholstery onto the structure of the seat or stuffed furniture—since there are no longer internal cords, the application of the upholstery onto the structure is easier and quicker. This advantage is transformed into about a 10% reduction in assembly times of the upholstery onto the structure of the seat or stuffed furniture.

The use of this method allows other advantages to be achieved such as, for example, the possibility of avoiding another processing step, i.e. the seam beating, which is normally performed to uniformly arrange and fix the joining cords under the upholstery. This also obviously translates into time and cost savings as the upholstery can be completely sewn in a single work station without moving any materials and/or operators.

To continue, it is hereby pointed out that by using this method, the bobbin thread (i.e. the one on the inside, non-visible, of the seam) may be a neutral colour for any colour of leather and thread to be used on the visible (upper) part. This leads to a saving in terms of both processing time (there is no need to change thread according to the colour of the visible thread to be coupled), and cost of thread (for the inside part a cheaper thread can be used with respect to the visible one, since it has no ornamental value).

The method described allows the production process to be simplified and its duration reduced. Some activities become superfluous (e.g. the skiving of the leather, necessary when the overlaps of leather edges create a too high thickness for processing with the sewing machine, or the beating of the seam, which is performed to uniform the positioning of the joining cords under the upholstery), while the others are made quicker (the absence of joining cords makes the upholstery lighter, more manageable and smoother, facilitating for example the assembly and application onto the structure of the seat or stuffed furniture; the possibility of using just a single machine eliminates the movements of personnel and movement of materials). By removing some processes (skiving and beating), it is possible to build a single machine for the processes that are currently performed with three different machines (machine for straight sewing, for beating and for skiving). This is also because the machine with a zig-zag stitch, appropriately regulated, can also perform the straight stitch.

The invention claimed is:

1. A method for assembling an upholstery for a seat or for stuffed furniture comprising the steps of:
   providing a first upholstery element and a second upholstery element to be sewn together, said first upholstery element and said second upholstery element each having an upper visible surface and a lower non-visible surface,
   placing alongside, until in abutting contact, in a coplanar manner, a first edge of said first upholstery element with a first edge of said second upholstery element,
   sewing together said first edge of said first upholstery element with said first edge of said second upholstery element with a 304 stitch;
   positioning a tensioning element in contact with said lower non-visible surfaces of said first upholstery element and said second upholstery element and joining said tensioning element to said first and second upholstery elements together with the 304 stitch at a same time with the 304 stitch.

2. The method according to claim 1, and further comprising sewing other edges of said upholstery by placing the other edges alongside one against the other in abutment position and joining the other edges with the 304 stitch, until a complete upholstery is formed.

3. The method according to claim 1, and further comprising adjusting a width of the 304 stitch to a value comprised between 2 and 10 mm and a length of the 304 stitch to a value comprised between 0.2 and 4 mm.

4. The method according to claim 1, and further comprising adjusting the width of the 304 stitch to 5 mm, and the length of the 304 stitch to 1.5 mm.

5. An upholstery for a seat or stuffed furniture comprising:
   a first upholstery element and a second upholstery element sewn together, said first upholstery element and said second upholstery element each having an upper visible surface and a lower non-visible surface,
   wherein a first edge of said first upholstery element and a first edge of said second upholstery element are positioned alongside one another, in abutting contact, in a coplanar manner,
   said first edge of said first upholstery element and said first edge of said second upholstery element being sewn together with a 304 stitch;
   a tensioning element positioned in contact with said lower non-visible surfaces of said first upholstery element and said second upholstery element and joining said tensioning element to said first and second upholstery elements together with the 304 stitch.

6. The upholstery according to claim 5, wherein it is made with a material chosen from the group comprising natural leather, microfiber, technical fabric, eco leather, reground leather, crust leather, alcantara and compact fabric.

7. The upholstery according to claim 5, wherein a width of the 304 stitch is comprised between 2 and 10 mm and a length of the 304 stitch is comprised between 0.2 and 4 mm.

8. The upholstery according to claim 7, wherein the width of the 304 stitch is 5 mm, and the length of the 304 stitch is 1.5 mm.

9. A use of a 304 stitch comprising:
   providing the 304 stitch as a single junction stitch for an abutted seam of materials having thicknesses comprised between 0.3 and 2.5 mm;
   creating a flat seam for joining junction points of a leather and a lining, by overlapping the lining and the leather in closing zones of the flat seam of a seat or stuffed furniture and in construction of a bottom part of seat cushions and back, where the lining is not visible.

10. The use of the 304 stitch, according to claim 9, as a joining seam on compact materials including natural leather, eco leather, reground leather, crust leather, microfiber, technical fabrics, alcantara, and compact fabrics.

* * * * *